(12) United States Patent
Yamamoto

(10) Patent No.: US 6,565,478 B2
(45) Date of Patent: May 20, 2003

(54) TOROIDAL CONTINUOUSLY VARIABLE TRANSMISSION

(75) Inventor: Takeshi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 10 days.

(21) Appl. No.: 09/908,890

(22) Filed: Jul. 20, 2001

(65) Prior Publication Data
US 2002/0019288 A1 Feb. 14, 2002

(30) Foreign Application Priority Data
Aug. 9, 2000 (JP) ........................................ 2000-240838

(51) Int. Cl.$^7$ .............................................. F16H 15/38
(52) U.S. Cl. ............................. 476/40; 476/46; 476/72
(58) Field of Search .............................. 476/40, 41, 42, 476/46, 72, 73

(56) References Cited

U.S. PATENT DOCUMENTS

| 4,126,052 | A | * | 11/1978 | Jackman | ....................... | 476/10 |
| 4,909,092 | A | * | 3/1990 | Machida et al. | ............... | 476/40 |
| 5,916,057 | A | | 6/1999 | Waltz et al. | .................... | 476/40 |

FOREIGN PATENT DOCUMENTS

| JP | 56-160453 | * | 12/1981 |
| JP | 62-270856 | * | 11/1987 |
| JP | 11-82659 | * | 3/1999 |

OTHER PUBLICATIONS

Patent Abstracts of Japan, "Half Toroidal Type Continuously Variable Transmission," by Machida, Publication No. 2000199552, Published Jul. 18, 2000.
Shoichi Noguchi, Mechanics, published from Industry Technology Center (1976).
Hirohisa Tanaka, "Power Transmission of a Cone Roller Toroidal Drive (1$^{st}$ Report, Speed and Torque Transmission Efficiencies)", Paper No. 86–1182A, Japan Society of Mechanical Engineers, vol. 53, No. 491.
Hirohisa Tanaka et al., "Spin Moment of a Thrust Ball Bearing in Traction Fluid.", Paper No. 89–0148B, Japan Society of Mechanical Engineers.
"Dynamic load ratings and rating life for rolling bearings.", Japanese Industrial Standard B1518, published by Japanese Standards Association, Tokyo, Japan.

* cited by examiner

Primary Examiner—William C Joyce
(74) Attorney, Agent, or Firm—Foley & Lardner

(57) ABSTRACT

A toroidal CVT is comprised of an input disc, an output disc coaxial with the input disc, and a power roller disposed on opposite surfaces of the input and output disc to transmit power from the input disc to the output disc. Dimensions and relationship of the input and output discs and the power roller are determined such that a spin S generated at each of a first contact point between the input disc and the power roller and a second contact point between the output disc and the power roller takes positive valve throughout a transmission ratio range of the toroidal CVT. When S={sin θ·sin ϕ−(1+k−cosϕ)·cosθ}/sin θ, values θ, ϕ and k are determined so that S is greater than or equal to zero.

9 Claims, 9 Drawing Sheets

|  | RELATED ART | INVENTION | |
| --- | --- | --- | --- |
|  |  | 1st EMBODIMENT | 2nd EMBODIMENT |
| k | 0.6 | 0.6 | 0.6 |
| θ(°) | 53.6 | 55.9 | 55.9 |
| i | 2~0.5 | 2~0.5 | 2~0.5 |
| φ(°) | 27.4~79.9 | 30.0~81.0 | 30.0~81.0 |
| R0(mm) | 40 | 40 | 40 |
| R22(mm) | 30 | 30 | 28.9 |
| Fc(N) AT i=1 | 39540 | 38460 | 38460 |
| Ft(N) AT i=1 | 46878 | 43133 | 43133 |

TOROIDAL CONTINUOUSLY VARIABLE TRANSMISSION

BACKGROUND OF THE INVENTION

The present invention relates to a toroidal continuously variable transmission (toroidal CVT) for a vehicle.

A toroidal CVT of a traction-drive type has been proposed and in practical use. Japanese Patent Publication No. (Heisei) 6-72653 discloses a half-toroidal CVT which is designed so as to suppress a spin loss.

SUMMARY OF THE INVENTION

However, a torodial CVT generally increases its power loss due to the increase of a spin loss when operated at a low-speed side transmission ratio and a high-speed side transmission ratio. Accordingly, when a vehicle employing the toroidal CVT travels an urban road where the low-speed side transmission ratio range is frequently used and a high-way where the high-speed side transmission ratio range is frequently used, it is difficult to maximally ensure a superior characteristic of the toroidal CVT. This will avoid the vehicle with the toroidal CVT from performing superior energy consumption and superior power performance in such transmission ratio ranges.

It is therefore an object of the present invention to provide a toroidal CVT which is capable of decreasing a total power loss in a low-speed side transmission-ratio range and at a high-speed side transmission-ratio range.

A toroidal CVT according to the present invention comprises an input disc and an output disc coaxial with the input disc. The output disc is disposed opposite to the input disc. A loading cam applies a pressing force proportional to an input torque to the input disc. A power roller is disposed on opposite surfaces of the input and output disc so as to be able to transmit power from the input disc to the output disc. A power-roller supporting member supports the power roller so that the power roller is inclinable on a center of a circular arc of the opposite surface of the input and output discs to vary a ratio between a rotation speed of the input disc and a rotation speed of the output disc within a transmission ratio range. A power-roller bearing is disposed between the power roller and the power-roller supporting member so that the power roller is rotatably supported to the power-roller supporting member. A spin generated at each of a first contact point between the input disc and the power roller and a second contact point between the output disc and the power roller takes positive value throughout the transmission ratio range.

DETAILED DESCRIPTION OF THE INVENTION

First, there will be discussed a reason for the increase of power loss of a torodial CVT of a related art in a low-speed side transmission-ratio range and in a high-speed side transmission-ratio range with reference to FIGS. 11 to 15.

Figure 11:
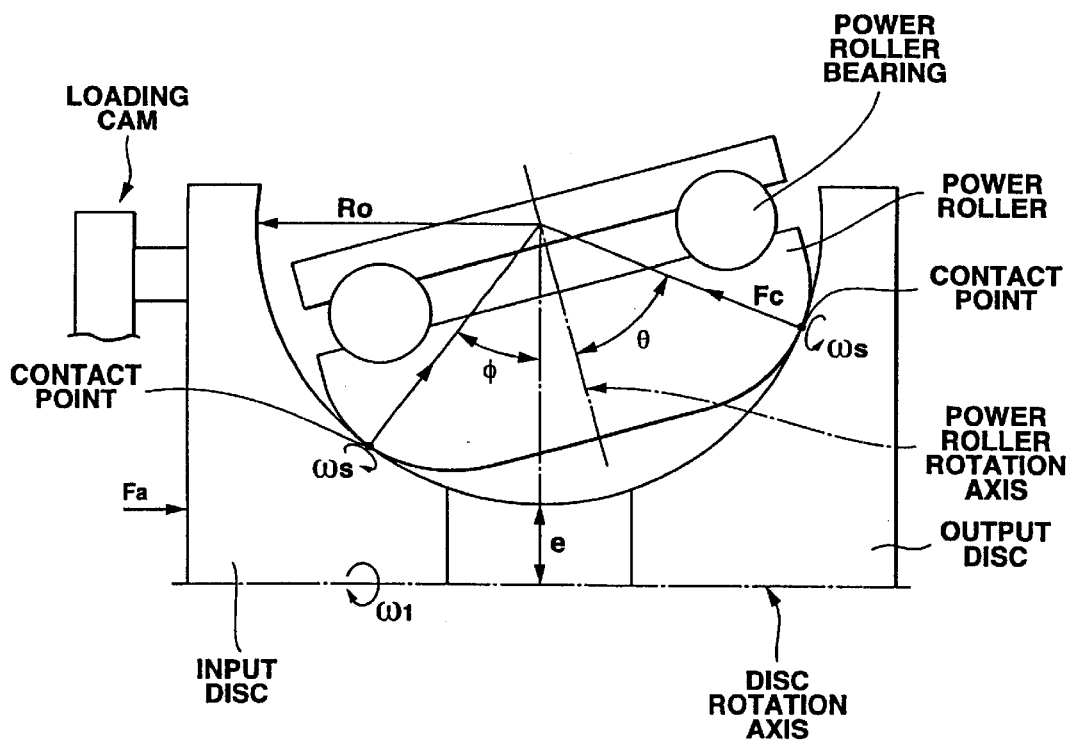
FIG. 11 is an explanatory view for explaining the relationship of dimensions of a related toroidal CVT.

As shown in FIG. 11, the toroidal CVT of the related art is arranged such that an opening angle θ is greater than or equal to 50°, a cavity aspect ratio k is greater than or equal to 0.6 and a spin S is within a range ±0.3; wherein the opening angle θ is an angle between a rotation axis of a power roller and a normal line at one of a contact point between an input disc and the power roller and a contact point between an output disc and the power roller, k=e/Ro in that Ro is a radius of a circular arc of the input and output discs and e is a difference between a distance from the circular arc to the rotation axis of the input and output discs and Ro, and $S=\omega_S/\omega_1$ in that $\omega_S$ is a relative slip angular speed generated by a difference of the respective speed dispersion in a contact surface between the power roller and the input and output discs and $\omega_1$ is an angular speed of the input disc.

When a power transmission is executed under a spin existing condition where the spin S exists at a contact point of power transmission members (input disc and power roller, output disc and power roller) of a toroidal CVT designed as shown in FIG. 11, a power loss is generated regardless a direction of the spin, that is, regardless a positive or negative value of the spin S. When a torque at the contact point generated by the spin S is $T_s$, the power loss $u_1$ is represented by the following equation (1).

$$u_1 = |\omega_S| \cdot T_S \tag{1}$$

This relationship of the equation (1) is disclosed in a book "Mechanics" written by Shoichi Noguchi and published from Industry Technology Center in 1976.

Figure 12:
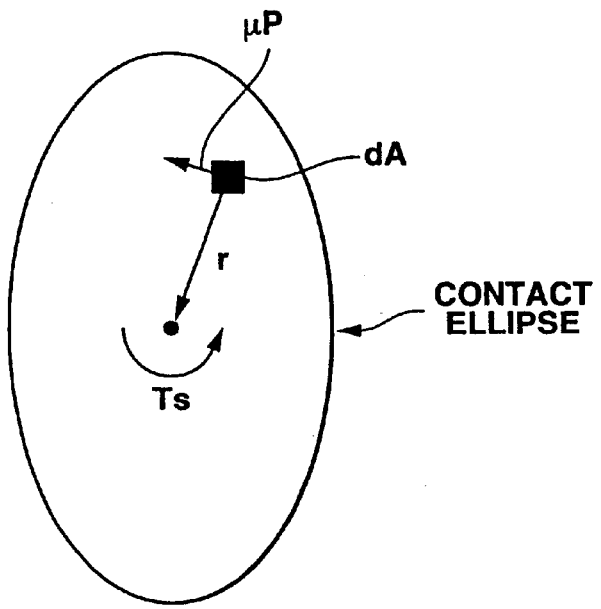
FIG. 12 is an explanatory view of explaining a torque generated at a contact point due to spin.

As shown in FIG. 12, $T_S$ is an integral of a product of a contact stress p and a friction coefficient μ at a very small area dA apart from a center of a contact ellipse by a distance r within a range of the contact ellipse. That is, $T_S$ is represented by the following equation (2).

$$T_S = \int p\mu r dA \quad (2)$$

A toroidal CVT generally executes a power transmission between an input disc and power rollers and between an output disc and the power rollers through oil films. Therefore, in order to obtain the friction coefficient $\mu$, it is necessary to obtain a friction coefficient of oil film at each position in the contact area upon taking account of a sliding speed, an oil temperature, and a bearing (face) pressure. In order to facilitate the explanation, it is assumed that the values are constant in the contact ellipse. Further, although the contact stress p is dispersed in the shape of semi-ellipse on the basis of the Hertz's contact theorem, it is assumed that the contact stress p is constant in the contact area. Further, although the area A of the contact ellipse is varied according to the magnitude of the load Fc to the contact point, it is assumed that the area A is constant. Accordingly, the following relationship (3) is obtained.

$$T_S \, p \, Fc \quad (3)$$

From the equation (1) and the relationship (3), the following relationship (4) is obtained.

$$u1 \, |\omega S| \cdot Fc \quad (4)$$

Assuming that an angular speed $\omega_1$ is constant, the following relationship (5) is obtained.

$$u1 \, |S| \cdot Fc \quad (5)$$

Figure 13:
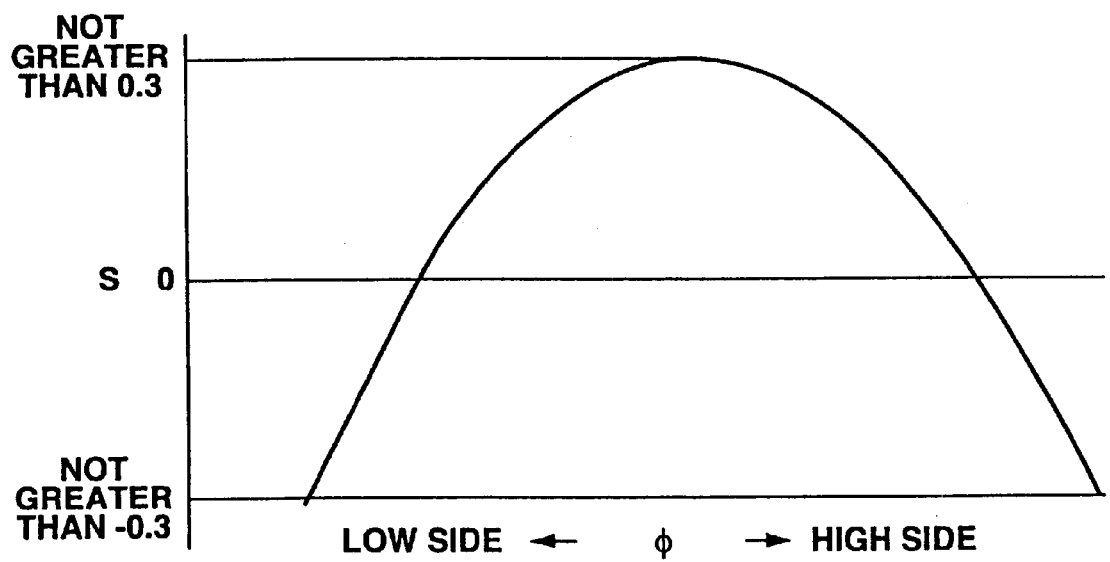
FIG. 13 is a graph showing a spin characteristic of a toroidal CVT of the related art.

This disclosed art is generally designed to keep a relationship $|S| \leq 0.3$ for the purpose of suppressing the power loss. Accordingly, the spin S varies with respect to the change of a tilt-gyration angle $\phi$ of the power rollers as shown in FIG. 13. Herein, the spin S is represented by the following equation (6).

$$S = \{\sin\theta \cdot \sin\phi - (1+k-\cos\phi) \cdot \cos\theta\} / \sin\theta \quad (6)$$

Further, when a pressing force of the loading cam to the input disc is Fa and the number of the power rollers is n, the contact point load is represented by the following equation (7).

$$Fc = Fa/(n \cdot \sin\phi) \quad (7)$$

This equation (7) has been derived from a paper No. 86-1182A "Power Transmission for a Cone Roller Toroidal Traction Drive" disclosed in a lecture to the Japan Society of Mechanical Engineers. When the input torque is constant, that is, when Fa is constant, the contact point load Fc becomes large as the power roller tilt-gyration angle $\phi$ becomes small, that is, as the transmission ratio approaches the lower side, as shown in FIG. 14.

Figure 14:
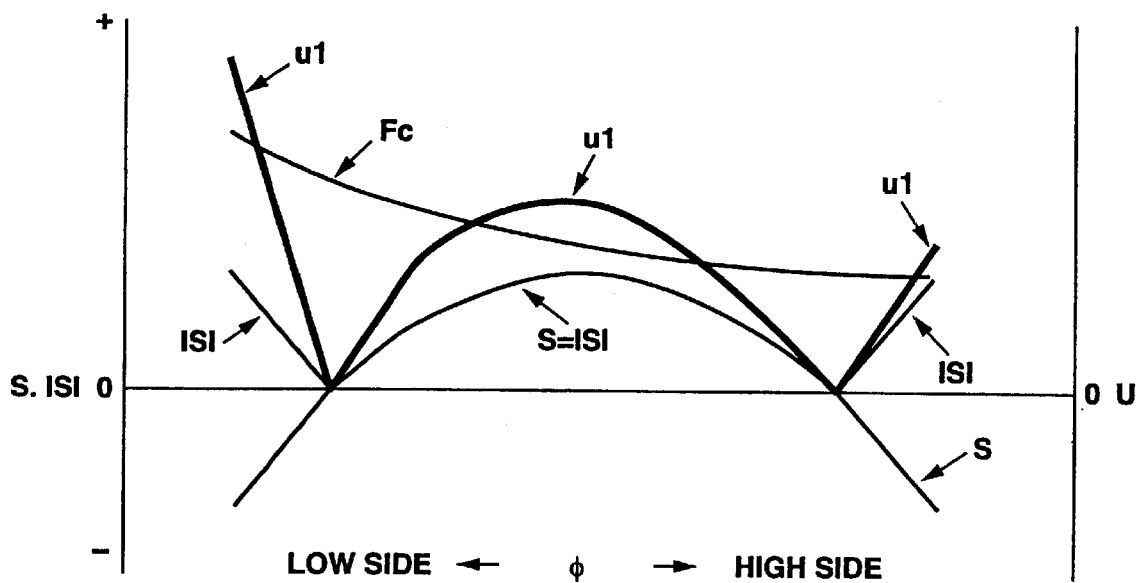
FIG. 14 is a graph showing a spin absolute characteristic and a contact point power loss characteristic and a contact point load characteristic of the toroidal CVT of the related art.

However, as shown in FIG. 14, the spin S takes a negative value when the transmission ratio is varied to the low-speed side. Accordingly, although the absolute value |S| of the spin S once decreases from $\phi=\theta$ (i=1) toward the low-speed side transmission ratio, the absolute value |S| increases from a gyration angle putting |S| at zero toward the further low-speed side transmission ratio. Accordingly, the power loss u1 which is proportional to the product of the absolute value |S| and the contact point load Fc becomes extremely large.

Figure 15:
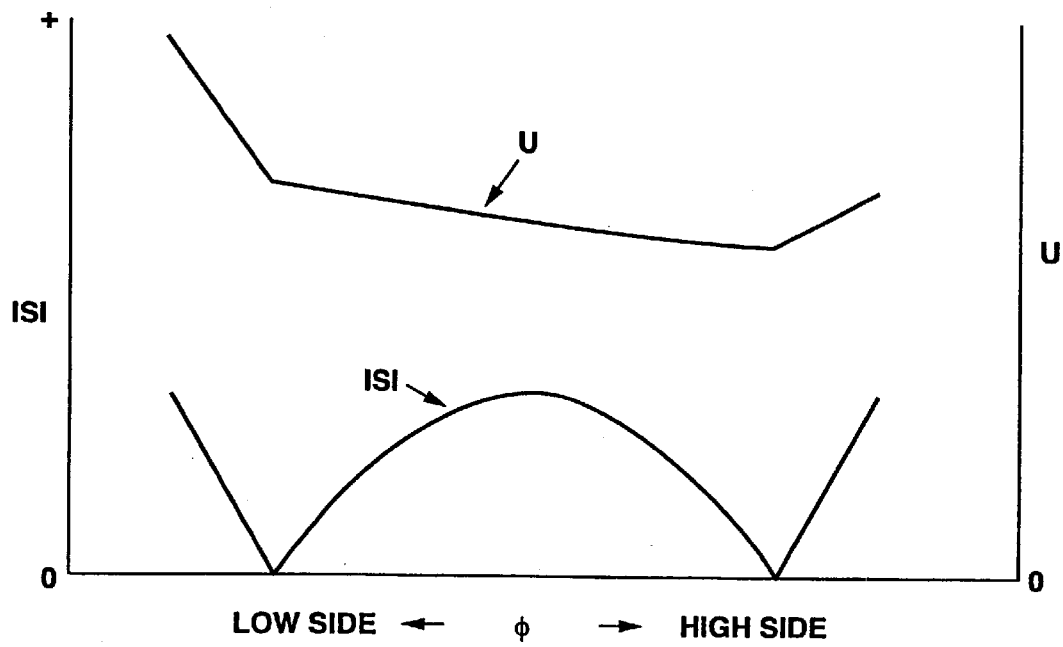
FIG. 15 is a graph showing the spin absolute characteristic and a total power loss characteristic of the toroidal CVT of the related art.

Although the calculation of the power loss $u_1$ has been simplified by assuming that $\mu$, p and A are constant, the same tendency is derived from the calculation where these $\mu$, p and A are strictly calculated. FIG. 15 shows a calculation result derived from a method for calculating a total power loss U which is the sum of a contact point power loss u1 and a power-roller bearing power loss u2. This calculation has been executed on the basis of the above-mentioned paper No. 86-1182A and a paper No. 89-0148B "Spin Moment of a Thrust Ball Bearing in Traction Fluid" disclosed in a lecture to the Japan Society of Mechanical Engineers. This result, which has been derived from the strict calculation, shows that the total power loss U increases at the low-speed side transmission-ratio and at the high-speed side transmission-ratio as shown in FIG. 15. This increase resulted from a fact that lowering the contact point load Fc cannot cancel the increase of the spin absolute value |S|.

On the basis of the above study, there are proposed preferred embodiments of a toroidal CVT, which are capable of decreasing the total power loss in the high-speed side transmission-ratio range and the low-speed side transmission-ratio range, hereinafter.

Referring to FIGS. 1 to 6, there is shown a first embodiment of a toroidal continuously variable transmission (toroidal CVT) of a dual cavity and half-toroidal type in according with the present invention.

Figure 1:
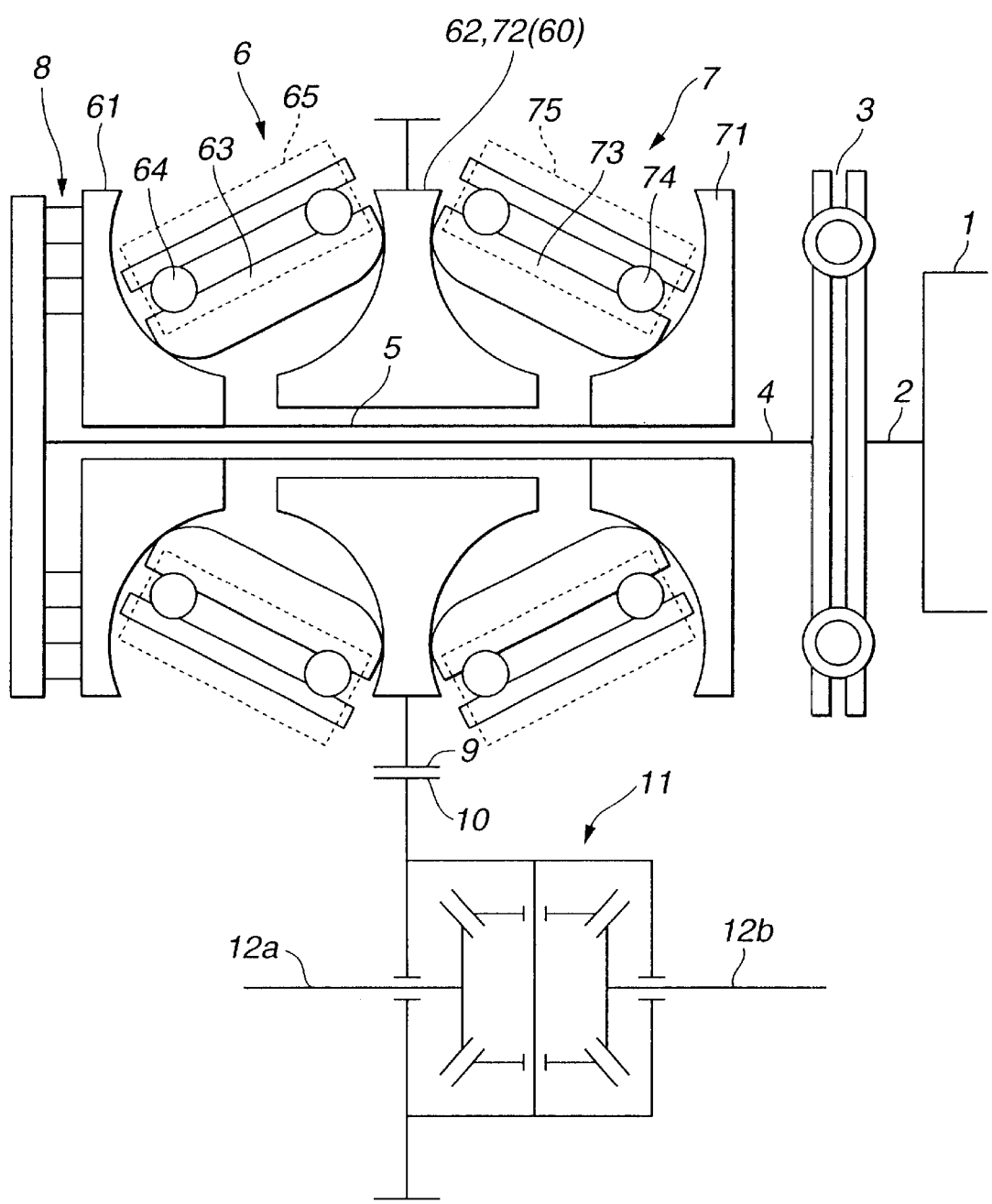
FIG. 1 is a skeleton view showing a toroidal continuously variable transmission (toroidal CVT) of a first embodiment according to the present invention.

As shown in FIG. 1, the toroidal CVT is for a vehicle and comprises an input shaft 4 connected to the an output shaft 2 of an internal combustion engine 1 through a torsion damper 3 and a hollow shaft 5 rotatably provided around shaft 4. The torodial CVT further comprises first and second transmission mechanism 6 and 7 and a loading cam 8. First and second transmission mechanism 6 and 7 are disposed around an axis of shafts 4 and 5. Loading cam 8 applies a pressing load proportional to an input torque to input discs 61 and 71 of first and second transmission mechanisms 6 and 7 along the axial direction.

First transmission mechanism 6 comprises an input disc 61 and an output shaft 62 which have toroidal surfaces, respectively. A pair of power rollers 63 are inclinably disposed between input and output discs 61 and 62 and transmits the power of engine 1 from input disc 61 to output disc 62. Similarly, second transmission mechanism 7 comprises an input disc 71 and an output shaft 72 which have toroidal surfaces, respectively. A pair of power rollers 73 are inclinably disposed between input and output discs 71 and 72 and transmits the power of engine 1 from input disc 71 to output disc 72.

As shown in FIG. 1, first transmission mechanism 6 is disposed at a far side to engine 1, and second transmission mechanism 7 is disposed at a near side to engine 1. Accordingly, elements of first and second transmission mechanisms 6 and 7 are aligned around the shafts 4 and 5 in the order of second input disc 71, second output disc 72, first output disc 62 and first output disc 61.

First and second input discs 61 and 71 are connected to hollow shaft 5 so as to be slidable in the axial direction. First and second output discs 61 and 72 are integrally formed, and this integrally formed output disc is treated as an integral output disc 60 hereinafter. An intermediate portion of this integral output disc 60 is rotatably supported to hollow shaft 5.

The two pairs of power rollers 63 and 73 are supported to four trunnions (power-roller supporting members) 65 and 75, respectively. Each of power roller bearings 64 and 74 is provided between each of power rollers 63 and 73 and each of trunnions 65 and 75 so that power rollers 63 and 73 are rotatably supported to trunnions 65 and 75, respectively.

An output gear 9 is provided around integral output disc 60 for first and second transmission mechanisms 6 and 7.

Output gear 9 is meshed with a drive gear 10 of a differential device 11 and transmits the rotational power of integral output disc 60 to right and left wheels of the vehicle through drive shafts 12a and 12b extending from differential device 11.

Figure 2:
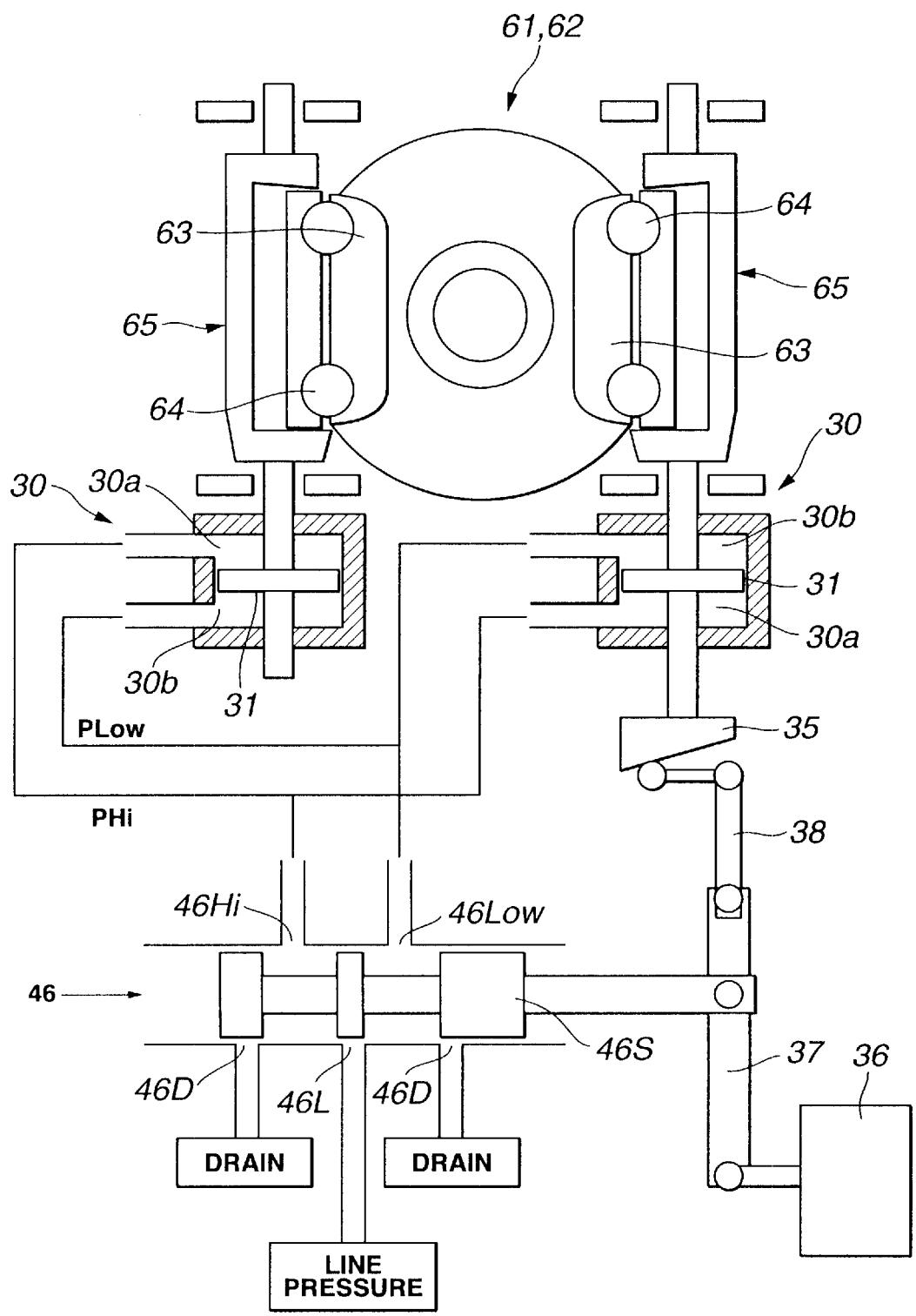
FIG. 2 is a schematic view showing a transmission control system of the toroidal CVT of the first embodiment.

FIG. 2 shows a hydraulic system for controlling a shifting of first transmission mechanism 6 of the toroidal CVT. Since a hydraulic system of the second transmission mechanism 7 is basically the same as that of the first transmission mechanism 6, only the hydraulic system of the first transmission mechanism 6 is explained and the explanation of the hydraulic system of the second transmission mechanism 7 is omitted herein.

First transmission mechanism 6 executes the shifting by displacing trunnions 65 from a balanced position to the other positions. Such a displacement of trunnions 65 generates a difference between rotation vectors of power rollers 63 and input and output discs 61 and 62, and thereby rotation axes of power rollers 63 are tilted.

Trunnions 65 are connected to a servo piston 31 of a hydraulic serve 30 and is displaced according to a pressure difference between hydraulic in the high-side cylinder 30a and hydraulic in a low-side cylinder 30b of hydraulic serve 30. Hydraulic pressures in both of high-side cylinder 30a and low-side cylinder 30b are controlled by a shift control valve 46.

Shift control valve 46 varies the pressure difference between the high-side and low-side cylinders 30a and 30b in a manner of displacing a spool 46S to flow hydraulic supplied from a line pressure port 46L to one of a high-side port 46Hi and a low-side port 46Low and to drain hydraulic from the other of the high-side port 46Hi and the low-side port 46Low.

Further, a precess cam 35 having a groove is installed to one of trunnions 65. An end of an L-shaped link 38 is in contact with the groove of precess cam 35, and the other end of L-shaped link 38 is supported to an end of I-shaped link 37. Therefore, a displacement and a tilt-gyration angle of trunnion 65 are feedbacked to I-shaped link 37. The other end of I-shaped link 37 is connected to a stepping motor 36, and spool 46S of shift control valve 46 is linked with I-shaped link 37. Accordingly, the displacement of speed 46S is determined from the displacement of stepping motor 36 and the feedback quantity of precess cam 35.

Figures 3, 4:
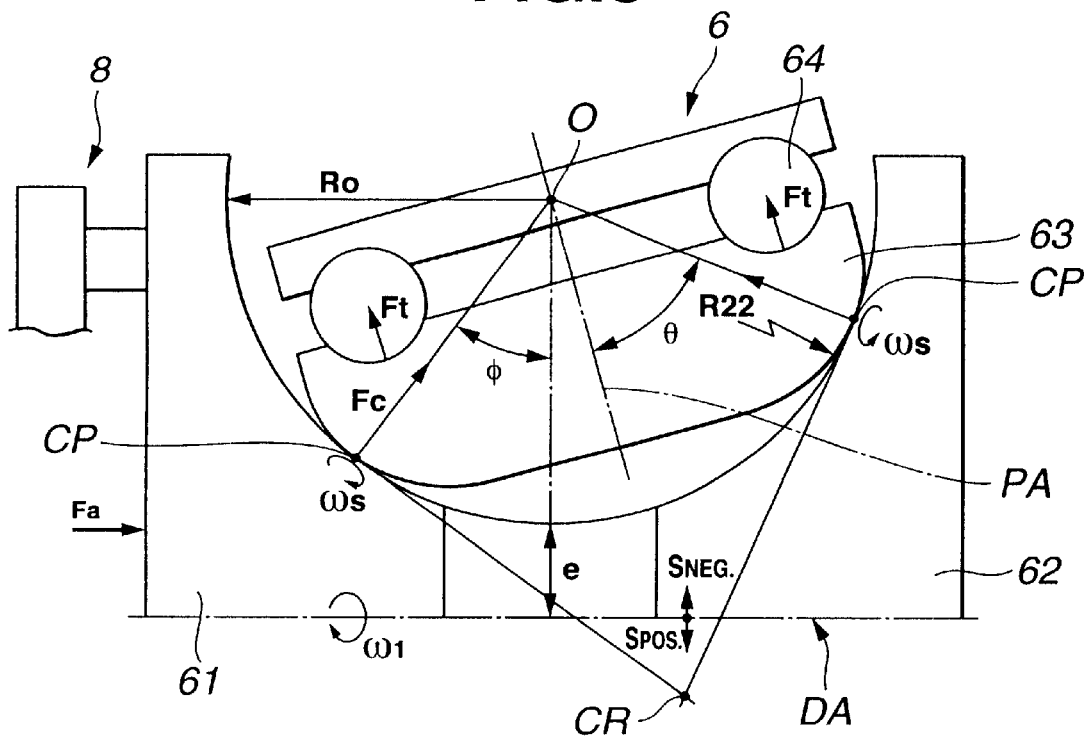
FIG. 3 is an explanatory view showing dimensions of the toroidal CVT of the first embodiment.
FIG. 4 is a table showing dimensions of the related art, the first embodiment and a second embodiment of the toroidal CVT.

FIG. 3 shows an explanatory view for the specification of the toroidal CVT according to the present invention. In FIG. 3, dimensions of first transmission mechanism 6, loading cam 8, input disc 61, output disc 62, power roller 63 and power-roller bearing 64 are represented, and the relationship thereamong are also represented. As is clear from FIG. 3, CP is a power-roller contact point which is a contact point between power roller 63 and input disc 61 and a contact point between power roller 63 and output disc 62. O is a center of a circular arc of the toroidal surfaces of input and output discs 61 and 62. PA is a rotation axis of power roller 63. DA is a rotation axis of input and output discs 61 and 62. CR and CR are intersections of two tangential lines with respect to two contact points CP. S is a spin generated at contact point CP and is $\omega_S/\omega_1$ ($S=\omega_S/\omega_1$), where $\omega_S$ is a spin angular speed (a relative slip angular speed at the contact point CP) and $\omega_1$ is an input-disc angular speed. $\theta$ is an opening angle between a normal line at contact point CP (a line connecting circular-arc center O and the contact point CP) and power-roller rotation axis PA. $\phi$ is a tilt-gyration angle of the power-roller 63. $R_0$ is a radius of the circular arc of input and output discs 61 and 62. e is a difference between a distance from circular-arc center O to disc rotation axis DA and radius $R_o$. R22 is a radius of a curvature of power roller 63. Fa is a pressing force of loading cam 8 to input disc 61. Fc is a load at the contact point CP. Ft is a thrust load applied to power roller bearing 64.

Second transmission mechanism 7 is arranged, as is the same as first transmission mechanism 6.

In this first embodiment, the opening angle $\theta$ is set at a value larger than the value of the toroidal CVT of the related art such that 53.6°→55.9°, in case that spin S is represented by the equation (6).

$$S=\{\sin\theta\cdot\sin\phi-(1+k-\cos\phi)\cdot\cos\theta\}/\sin\theta \qquad (6)$$

This arrangement according to the present invention enables spin S to always take a positive value larger than zero throughout the transmission ratio range (2.0 to 0.5) from the lowest-speed transmission ratio (2.0) to the highest-speed transmission ratio (0.5), in contrast to the related art where $\theta$, $\phi$, k are set so that the value of spin S ranges within ±0.3 throughout the transmission ratio range (2.0 to 0.5).

The arrangement according to the present invention, which enables the spin S to take a positive valve throughout the whole transmission ratio range, is equal to the arrangement that the intersection CR of the two tangential lines with respect to contact points CP and CP is located more apart from the circular-arc center O than rotation axis DA of input and output discs 61 and 62. That is, a distance between circular-arc center O and the intersection CR is always greater than the distance between circular-arc center O and a point of DA intersected with a line connecting circular-arc center O and intersection CR. That is, when intersection CR is located on disc rotation axis DA, S=0. When the intersection CR is located at a position which is closer to circular-arc center O than a point on disc rotation axis DA according to the intersection CR, spin S takes a negative value.

As shown in FIG. 4, the first embodiment according to the present invention is arranged to set the opening angle $\theta$ at 55.9° so as to be greater than the opening angle 53.6° of the related art. Further, in order to ensure a transmission ratio range as same as that of the related art, a variable range of power-roller tilt-gyration angle $\phi$ is changed from a range of a related art ranging from 27.4° to 79.9° to a new range ranging from 30° to 81°. Furthermore, k=0.6, $2 \geq i \geq 0.5$, $R_o$=40 mm, R22=30mm are the same as those of the related art. Herein, when input disc rotation speed is Ni and output disc rotation speed is No, transmission ratio i is represented by the following equation (8).

$$i=Ni/No \qquad (8)$$

Next, the manner of operation of the toroidal CVT of the first embodiment according to the present invention will be discussed.

Figure 5:
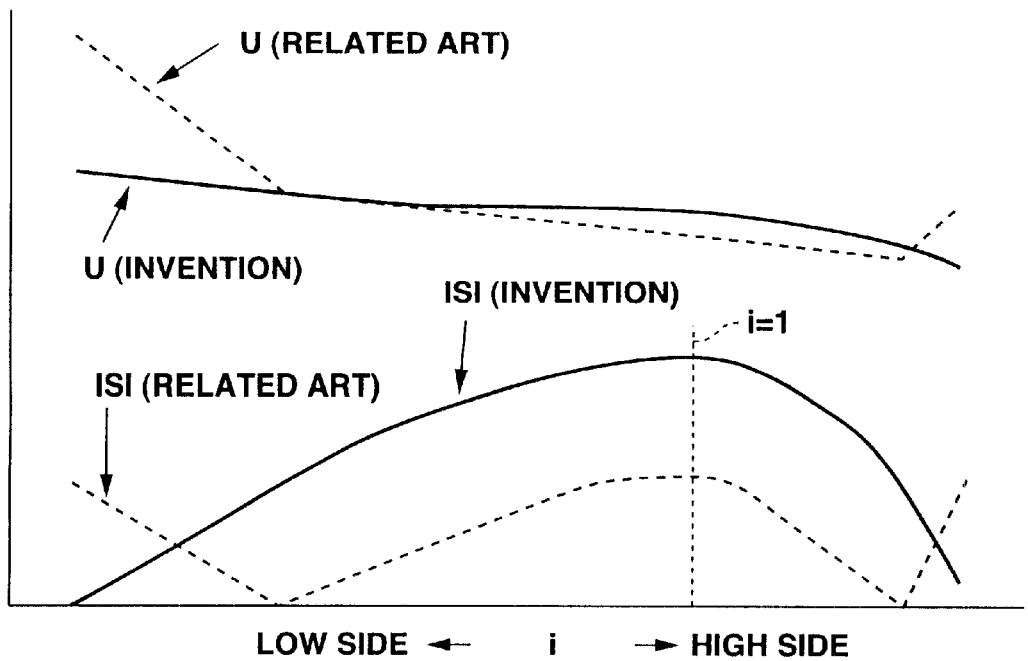
FIG. 5 is a graph showing a relationship of a spin absolute value characteristic and a total power loss characteristic of the related art, the first embodiment and a second embodiment of the toroidal CVT.

Spin S in the first embodiment always takes positive value throughout the whole transmission ratio range from the low-speed side transmission ratio to the high-speed side transmission ratio, and therefore S=|S| is always satisfied. Accordingly, the absolute value |S| of spin S is monotonously decreased with respect to the change of transmission ratio i from i=1 to the low-speed side or to the high-speed side, as shown in FIG. 5. Therefore, the spin absolute value |S| generally cancels the change of contact-point load Fc generated between input and output discs 61 and 62 and power rollers 63, and the contact point power loss u1, which is in proportion to the product of |S| and Fc, performs a generally flat characteristic as shown by a continuous line U of the present invention in FIG. 5. More specifically, the increase of the contact point power loss u1 is suppressed in both the low-speed side transmission-ratio range and the high-speed side transmission-ratio range. Accordingly, the total power loss U in the low-speed side transmission ratio range and in the high-speed side transmission ratio range is decreased as compared with that of the toroidal CVT of the related art, as shown in FIG. 5.

Further, due to the whole positive setting of spin S, spin absolute value |S| near i=1 becomes greater than that of the toroidal CVT of the related art, and contact-point power loss u1 (u1 |S|·Fc) near i=1 also increases.

Next, the characteristic of bearing power loss u2 will be discussed.

Thrust load Ft applied to power roller bearings 64 is represented by the following equation (9).

$$Ft = 2Fc \cdot \cos\theta \quad (9)$$

Figure 6:
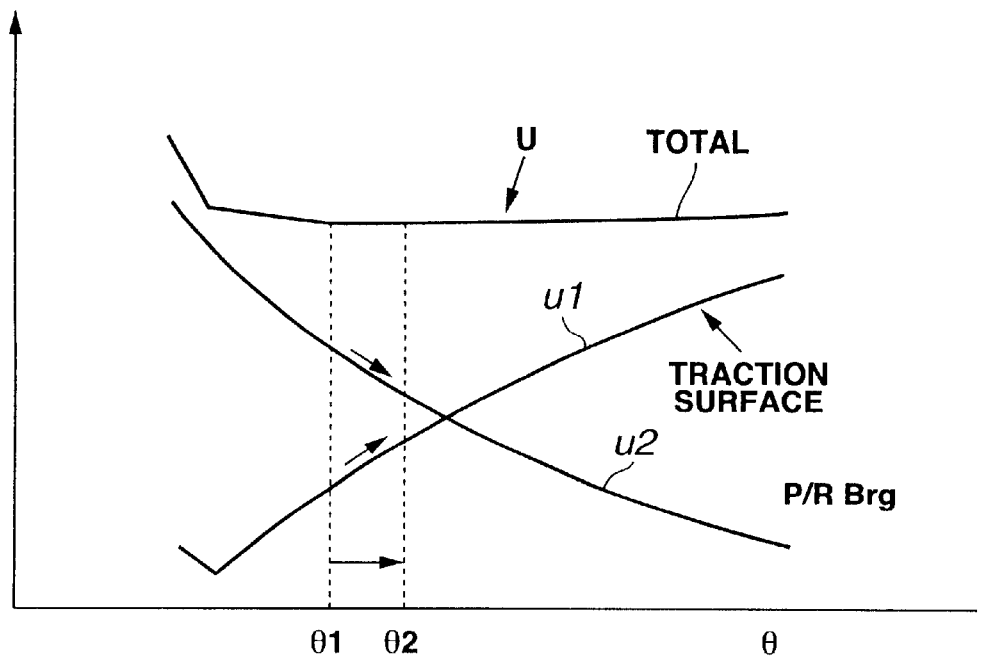
FIG. 6 is a graph showing a contact-point power loss, a bearing power loss and the total power loss of the toroidal CVT according to the first embodiment.

Therefore, thrust load Ft is deceased by increasing the opening angle $\theta$ as compared with that of the toroidal CVT of the related art. Further, since bearing power loss u2 is generally in proportion to thrust load Ft, bearing power loss u2 is also decreased as compared with that of the toroidal CVT of the related art. FIG. 6 shows characteristic curves of contact-point power loss u1, bearing power loss u2 and total power loss U in case that the opening angle $\theta$ is varied. As is clear from FIG. 6, when the opening angle $\theta$ is increased from $\theta 1$ to $\theta 2$, contact-point power loss u1 is increased and bearing power loss u2 is decreased and total power loss U is almost the same as that at $\theta 2$.

As a result, total power loss U, which is the sum of contact-point power loss u1 and bearing power loss u2, is generally the same as compared with that of the toroidal CVT of the related art when transmission ratio i is generally equal to 1. Further, this first embodiment ensures a variable range of the transmission ratio, such as a range from 2.0 to 0.5 by slightly varying power-roller tilt-gyration angle $\phi$. Furthermore, since a cavity aspect ratio k (k=e/$R_o$) is not varied as compared with the toroidal CVT of the related art, dimensions of toroidal CVT according to the present invention are the same as those of the toroidal CVT of the related art.

Accordingly, although the maximum value of spin S becomes large by the change of the opening angle $\theta$ as compared with the toroidal CVT of the related art, it is possible to decrease total power loss U in the low-speed side and high-speed side transmission-ratio ranges while total power loss U about i=1 is generally equal to that of the toroidal CVT of the related art.

Additionally, this first embodiment ensures a variable range of the transmission ratio by slightly varying power-roller tilt-gyration angle $\phi$. Further since cavity aspect ratio k is not varied as compared with the toroidal CVT of the related art, dimensions of the toroidal CVT according to the present invention are the same as those of the toroidal CVT of the related art. This enables the toroidal CVT according to the present invention to be replaced with the toroidal CVT of the related art without largely changing the designs including the relation with peripheral members.

Figure 7:
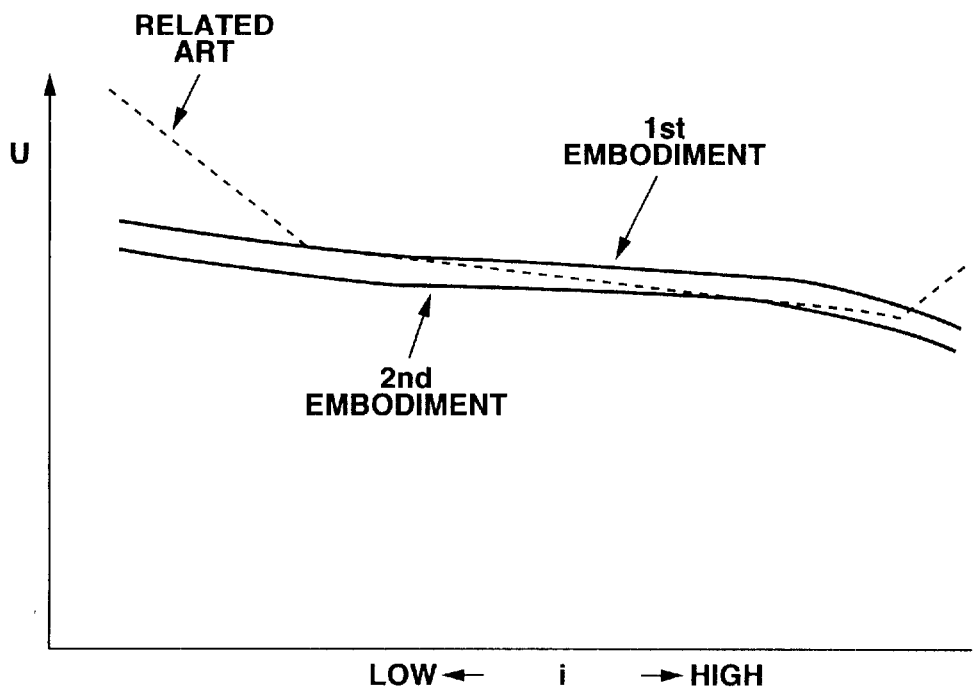
FIG. 7 is a graph showing a comparison of total power loss U of the second embodiment with those of related art and the first embodiment.

Referring to FIGS. 4 and 7, there is shown a second embodiment of the toroidal CVT according to the present invention.

The second embodiment is designed such that the opening angle $\theta$ is set at 55.9° (53.6°→55.9°), a range of power-roller tilt-gyration angle $\phi$ is set in a range 30° to 81° (27.4° to 79.9°→30° to 81°), and the radius R22 of curvature of power roller 63 is set at 28.9 mm (30 mm →28.9 mm) so that a dynamic rating life at i=1 is ensured as is the same as that of the toroidal CVT of the related art. The determination of the dynamic rating life of power roller 63 was executed on the basis of JIS B1518 (Japanese Industrial Standard B1518, titled of "Dynamic load ratings and rating life for rolling bearings"). The other construction of the second embodiment is the same as that of the first embodiment, and therefore the explanation thereof is omitted herein.

By increasing the opening angle $\theta$, contact-point load Fc of power roller 63 is decreased. This is apparently proved by the fact that contact-point load Fc at i=1 is decreased from 39540N to 38469N as shown in FIG. 4. Since contact-point load Fc is decreased, the rolling fatigue life of input and output discs 61 and 62 and power rollers 63 are extended. However, in the first embodiment only the opening angle $\theta$ and the power-roller tilt-gyration angle $\phi$ have been varied while the other of the specific data as to the toroidal CVT is not varied. Therefore, the second embodiment is arranged such that the radius R22 of curvature of power roller 63 is decreased in addition to the changes in the first embodiment.

Next, the manner of operation of the toroidal CVT of the second embodiment according to the present invention will be discussed.

By decreasing the radius R22 of the curvature of power roller 63, the area of the contact ellipse between input and output discs 61 and 62 and power rollers 63 is decreased, and therefore the contact point power loss u1 is decreased.

As a result, as shown in FIG. 7, total power loss U of the second embodiment does not increase in the low-speed side and high-speed side transmission-ratio ranges as compared with that of the toroidal CVT of the related art, and is smaller than that of the first embodiment throughout all transmission-ratio range.

Figure 8:
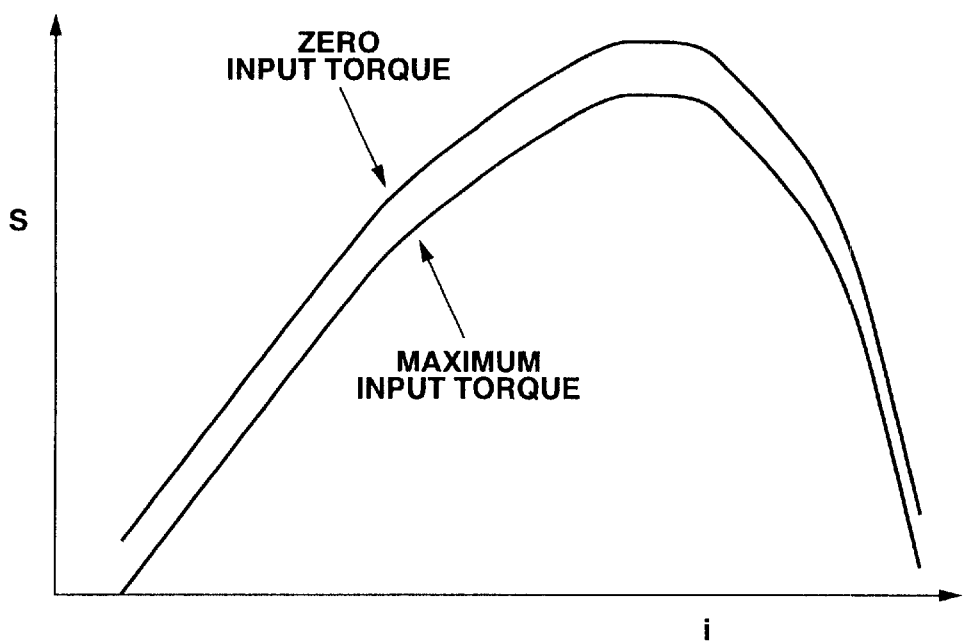
FIG. 8 is a graph showing a spin characteristic of the toroidal CVT of a third embodiment.

Referring to FIG. 8, there is shown a third embodiment of toroidal CVT according to the present invention.

In this third embodiment, $\theta$, $\phi$, k are determined so that spin S always takes positive value in all transmission-ratio range even when the maximum input torque is applied to input and output discs 61 and 62. That is, as shown in FIG. 8, the minimum value of spin S in case that input torque is zero is set to be greater than zero. The other construction of the third embodiment is the same as those of the first embodiment, and therefore the explanation thereof is omitted herein.

The manner of operation of the third embodiment will be discussed. When the contact-point load Fc of power roller 63 is increased according to the increase of the input torque, a deformation quantity of input and output discs 61 and 62 and a deformation quantity of trunnions 65 are increased. Accordingly, the contact points CP between input and output discs 61 and 62 and power rollers 63 are drifted so as to decrease spin S. Therefore, by setting the minimum value of spin S upon taking account of the decrease of spin S due to the input torque, it becomes possible to prevent the increase of contact-point u1 from increasing in the low-speed side and high-speed side transmission-ratio ranges without taking negative value.

Figure 9:
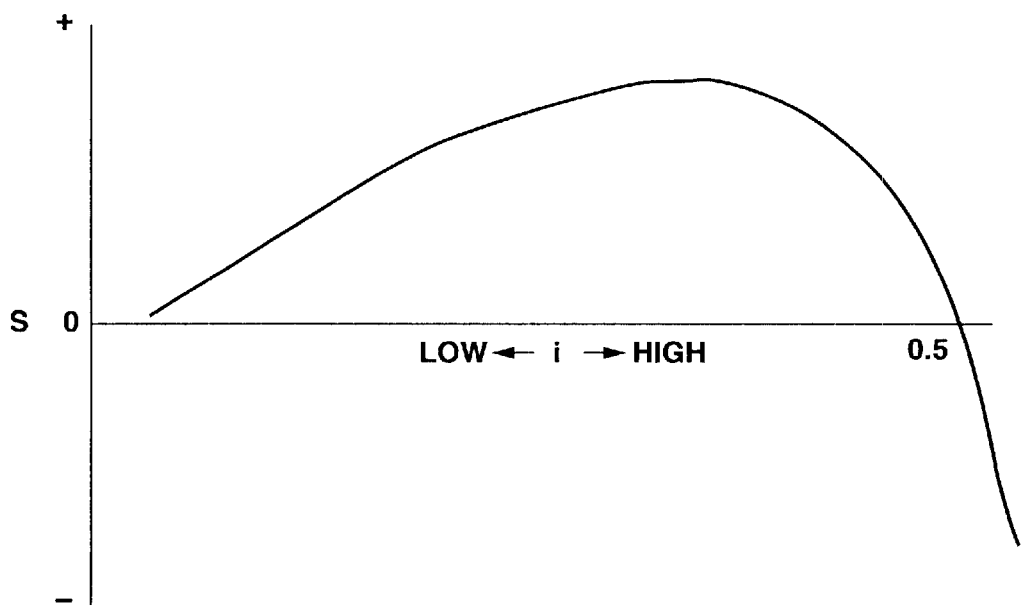
FIG. 9 is a graph showing a spin characteristic of the toroidal CVT of a fourth embodiment.

Referring to FIG. 9, a fourth embodiment of toroidal CVT according to the present invention will be discussed. The fourth embodiment is particularly arranged such that a range of the tilt-gyration angle of power roller 63 is expanded toward a high-speed side transmission ratio. Although spin S at contact point CP between input and output discs 61 and 62 and power rollers 63 takes a negative value in the high-speed side transmission ratio range, spin S takes positive value in the other transmission-ratio range except for the high-speed side transmission-ratio range. This arrangement is achieved by properly selecting the values for θ, φ, k. The other construction of the fourth embodiment is the same as that of the first embodiment, and therefore the explanation thereof is omitted herein.

The manner of operation of the fourth embodiment according to the present invention will be discussed hereinafter. By extending tilt-gyration angle range of power rollers 63, the transmission ratio range toward a further high-speed side and low-speed side transmission ratio is increased. Further, by setting spin S so as to be greater than or equal to zero in addition to the expansion of the tilt-gyration angle range, spin S increases in the whole transmission ratio range and the maximum value of spin S, which is ensured when i=1, is increased and therefore contact-point power loss u1 also increases.

However, the fourth embodiment is arranged such that only the high-speed side tilt-gyration angle range of power roller 63 is extended. Therefore, when i<0.5 (high-speed side transmission ratio range), spin S takes negative value, and therefore the absolute value |S| of spin S increases.

However, contact-point load Fc is decreased as transmission ratio approaches the high-speed side. Therefore, the increase of contact point power loss u1 in the high-speed side transmission ratio is suppressed. Accordingly, it is possible to extend the transmission ratio range toward a further high-speed side while suppressing the increase of contact point power loss u1 by increasing the tilt-gyration angle range of power roller 63 only toward the high-speed side.

Figure 10:
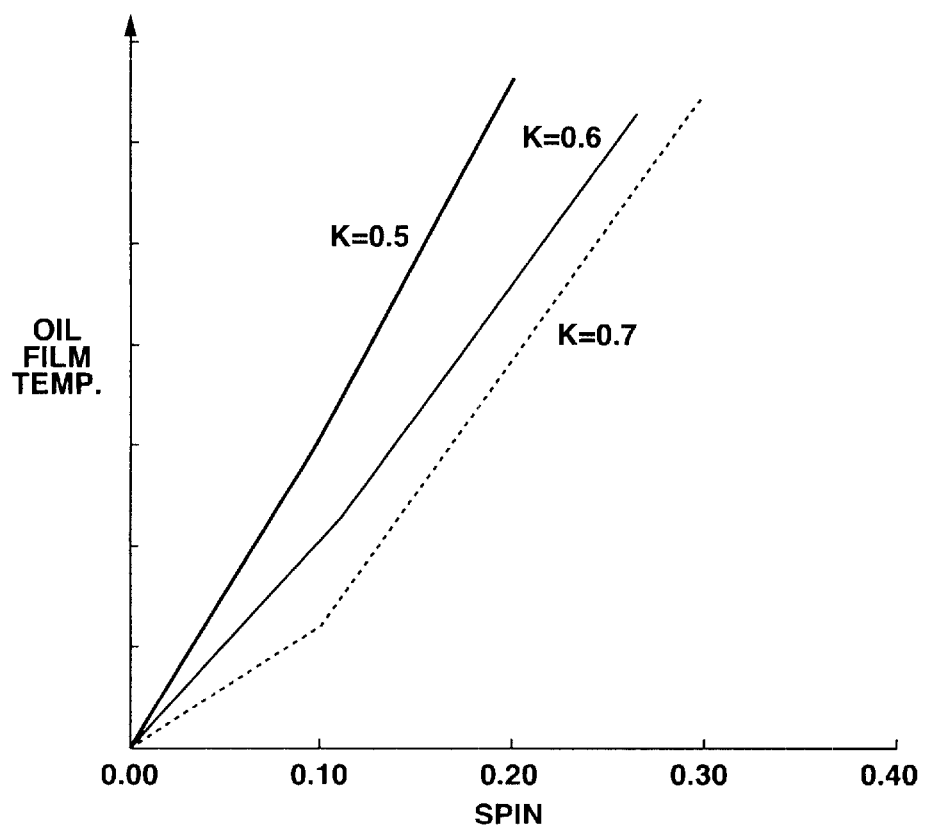
FIG. 10 is a graph showing a relationship among an oil film temperature, k and the opening angle θ of the toroidal CVT according to a fifth embodiment.

Referring to FIG. 10, a fifth embodiment of toroidal CVT according to the present invention will be discussed.

In this fifth embodiment, θ, φ and k are determined so that the minimum value of spin S takes a value smaller than or equal to 0.1. The other construction of the fifth embodiment is the same as that of the first embodiment, and therefore the explanation of the other construction is omitted herein.

The manner of the operation of the fifth embodiment will discussed. When the opening angle θ is increased in order to decrease thrust load Ft to power roller bearing 64, spin S increases and therefore the temperature of oil film at contact point CP between input and output discs 61 and 62 and power rollers 63. This increase of the oil film temperature degrades the power transmitting performance of the toroidal CVT.

FIG. 10 shows a relationship among the temperature of the oil film at a portion between the input and output discs and the power rollers, spin S and k. As is clear from FIG. 10, a rate of the increase of the oil film temperature with respect to the increase of spin becomes large when spin S becomes greater than 0.1. Therefore, it is necessary that spin S in the low-speed side transmission ratio is lower than 0.1, in order to prevent the power transmitting performance of the toroidal CVT during the start of the vehicle.

By properly setting θ, φ and k so that the minimum value of spin S becomes smaller than or equal to 0.1, it becomes possible to suppress the increase of the oil film temperature at contact point CP between input and output discs 61 and 62 and power rollers 63.

While the first to fifth embodiments according to the present invention have been shown and described such that spin S is specifically set on the basis of the spin of the toroidal CVT of the related art, it will be understood that the invention is not limited to this and may be arranged such that θ, φ, k are properly set so that spin S at the contact point CP is greater than or equal to 0 throughout the whole transmission ratio range. Further, the toroidal CVT according to the present invention may be adapted to a transmission mechanism for a transmission ratio infinite continuously variable transmission (IVT).

This application is based on a prior Japanese Patent Application No. 2000-215977 filed on Jul. 17, 2000 in Japan. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A toroidal continuously variable transmission comprising:

an input disc;

an output disc coaxial with the input disc, the output disc being disposed opposite to the input disc;

a loading cam applying a pressing force proportional to an input torque to the input disc;

a power roller disposed on opposite surfaces of the input and output disc so as to be able to transmit power from the input disc to the output disc;

a power-roller supporting member supporting the power roller so that the power roller is inclinable on a center of a circular arc of the opposite surfaces of the input and output discs to vary a ratio between a rotation speed of the input disc and a rotation speed of the output disc within a transmission ratio range; and a power-roller bearing disposed between the power roller and the power-roller supporting member so that the power roller is rotatably supported to the power-roller supporting member;

wherein a spin generated at each of a first contact point between the input disc and the power roller and a second contact point between the output disc and the power roller takes a positive value greater than or equal to zero throughout the transmission ratio range; and wherein the spin becomes larger as the transmission ratio approaches to a center of the transmission ratio range, and the spin is greater than or equal to zero throughout the transmission ratio range.

2. The toroidal CVT as claimed in claim 1, wherein when the spin is S and is represented by the following equation:

$$S=\{\sin\theta\cdot\sin\phi-(1+k-\cos\phi)\cdot\cos\theta\}/\sin\theta$$

where $S=\omega_S/\omega_1$ in that $\omega_S$ is a relative slide angular speed at the contact point and $\omega_1$ is an input disc angular speed, θ is an opening angle between a normal line at a contact point and a rotation axis of the power roller, φ is a tilt-gyration angle of the power roller, $k=e/R_o$ in that $R_o$ is a radius of a circular arc of the input and output discs, and e is a difference between a distance from the circular-arc center O to the rotation axis of the input and output discs and the radius $R_o$, θ, φ and k are determined so that the spin S is greater than or equal to zero throughout the transmission ratio range.

3. The toroidal CVT as claimed in claim 2, wherein the opening angle θ is increased and the radius of a curvature of the power roller is decreased as compared with an opening angle θ and a radius of a curvature of the power roller, respectively, of a toroidal CVT which is arranged such that the spin S ranges within ±0.3.

4. The toroidal CVT as claimed in claim 2, wherein the spin S is greater than or equal to zero even when a maximum torque is applied to the input and output discs.

5. The toroidal CVT as claimed in claim 2, wherein a tilt-gyration angle range of the power roller corresponding to a high-speed side transmission ratio is greater the tilt gyration angle range of the power roller corresponding to the low speed side transmission ratio.

6. The toroidal CVT as claimed in claim 2, wherein the minimum value of the spin S throughout the whole transmission ratio range is smaller than or equal to 0.1.

7. The toroidal CVT as claimed in claim 1, wherein the input and output discs and the power roller are arranged such that an intersection between a first tangential line at the first contact point and a second tangential line at the second contact point is located more apart from a circular-arc center than a rotation axis of the input and output discs.

8. The toroidal CVT as claimed in claim 1, wherein a distance between a circular-arc center and a first intersection between a first tangential line at the first contact point and a second tangential line at the second contact point is always greater than a distance between the circular-arc center and a second intersection between a rotation axis of the input and output discs and a line including the circular-arc center and the first intersection.

9. The toroidal CVT as claimed in claim 1, wherein the spin is greater than zero at least at one point in the transmission ratio range.

* * * * *